US008670762B2

(12) United States Patent  
Mohanty et al.

(10) Patent No.: US 8,670,762 B2
(45) Date of Patent: Mar. 11, 2014

(54) FAST SERVING CELL CHANGE

(75) Inventors: Bibhu P. Mohanty, San Diego, CA (US); Aziz Gholmieh, Del Mar, CA (US); Mehmet Yavuz, San Diego, CA (US); Peter Rauber, Del Mar, CA (US); Rohit Kapoor, San Diego, CA (US); Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1225 days.

(21) Appl. No.: 12/100,853

(22) Filed: Apr. 10, 2008

(65) Prior Publication Data

US 2008/0261599 A1  Oct. 23, 2008

Related U.S. Application Data

(60) Provisional application No. 60/912,680, filed on Apr. 18, 2007.

(51) Int. Cl.
*H04W 36/00* (2009.01)

(52) U.S. Cl.
USPC ........ 455/437; 455/436; 455/452.2; 455/450; 370/331

(58) Field of Classification Search
USPC ................ 455/436–444, 452.2, 67.13, 422.1, 455/450–455, 464, 509; 370/321–337, 339, 370/341–348, 431–463
See application file for complete search history.

(56) References Cited

U.S. PATENT DOCUMENTS

| 2001/0030953 A1* | 10/2001 | Chang ........................... 370/331 |
| 2003/0016698 A1 | 1/2003 | Chang et al. |
| 2006/0007889 A1 | 1/2006 | Khan |
| 2007/0049278 A1 | 3/2007 | Lindoff et al. |
| 2008/0167089 A1* | 7/2008 | Suzuki et al. ................. 455/574 |

FOREIGN PATENT DOCUMENTS

| EP | 1773009 | 4/2007 |
| EP | 1773075 A2 | 4/2007 |
| JP | 2006025438 A | 1/2006 |
| RU | 2242092 C2 | 12/2004 |
| TW | 200706045 | 2/2007 |
| WO | WO2006035297 A2 | 4/2006 |
| WO | WO2007025971 A1 | 3/2007 |
| WO | WO2007040331 A1 | 4/2007 |

OTHER PUBLICATIONS

3GPP TS 25.308 V7.2.0 (Mar. 2007): 3rd Generation Partnership Project; Technical Specification Group Radio Access Network; High Speed Downlink Packet Access (HSDPA); Overall description; Stage 2 (Release 7).*

(Continued)

*Primary Examiner* — Ronald Eisner
(74) *Attorney, Agent, or Firm* — Charles Chesney

(57) ABSTRACT

In a wireless communication system in which a user using a mobile equipment requests a serving cell handoff from a source cell to a target cell, the mobile equipment monitors authorization for the handoff from the target cell. At the same time, the mobile equipment can decode data from either the source cell or the target cell. Upon receipt of authorization for the handoff, the mobile equipment sends confirmation of the handoff to the target cell.

23 Claims, 8 Drawing Sheets

(56) References Cited

OTHER PUBLICATIONS

3GPP TS 25.214 V7.4.0 (Mar. 2007): 3rd Generation Partnership Project; Technical Specification Group Radio Access Network; Physical layer procedures (FDD) (Release 7).*

International Search Report—PCT/US08/060693—International Search Authority, European Patent Office—Oct. 21, 2008.

Written Opinion—PCT/US08/060693—International Search Authority, European Patent Office—Oct. 21, 2008.

"Universal Mobile Telecommunications System (UMTS); High Speed Downlink Packet Access (HSDPA); Overall description; Stage 2 (3GPP TS 25,308 version 7.2.0 Release 7); ETSI TS 125.308," ETSI Standards, Lis, Sophia Antipolis Cedex, France, vol. 3-R2, No. V7.2.0, Mar. 1, 2007.

"Universal Mobile Telecommunications System (UMTS); Physical layer procedures (FDD) (3GPP TS 25.214 version 7.4.0 Release 7); ETSI TS 125.214," ETSI Standards, Lis, Sophia Antipolis Cedex, France, vol. 3-R1, No. V7.4.0, Mar. 1, 2007.

"Universal Mobile Telecommunications System (UMTS); Multiplexing and channel coding (FDD) (3GPP TS 25.212 version 7.4.0 Release 7); ETSI TS 125.212," ETSI Standards, Lis, Sophia Antipolis Cedex, France, vol. 3-R1, No. V7.4.0, Mar. 1, 2007.

Qualcomm Europe, "Improving Reliability of HS-PDSCH Serving Cell Change Procedure," 3GPP TSG-RAN WG1 #52, R1-080815, Feb. 11, 2008, pp. 1-8.

Taiwan Search Report—TW097114416—TIPO—Aug. 23, 2011.

* cited by examiner

US 8,670,762 B2

FAST SERVING CELL CHANGE

CLAIM OF PRIORITY UNDER 35 U.S.C §119

The present application for patent claims priority to U.S. Provisional Application No. 60/912,680, entitled "Methods and Apparatus for Providing Fast Serving Cell Change," filed on Apr. 18, 2007, and assigned to the assignee hereof and expressly incorporated by reference herein.

BACKGROUND

I. Field

The present invention generally relates to telecommunications, and more particularly, to providing fast and reliable change of communication cells to a user in a wireless communication system.

II. Background

In telecommunications, especially wireless communications, communication environments are not static but rather dynamic. In a mobile communication setting, some communication entities such as a User Equipment (UE) operated by a user may move from one location to another at different points in time.

Reference is directed to FIG. 1 which shows a simplified schematic illustrating an exemplary communication system. In the following description, terminology associated with the Wideband Code Division Multiple Access (WCDMA) or Universal Mobile Telecommunications Systems (UMTS) is used. The terminology and basic principles of operation of a UMTS communication system can be found from 3GPP ($3^{rd}$ Generation Partnership Project) Specifications 25.211-215, etc., published by the 3GPP.

In FIG. 1, there is a core network 20 linked to the Internet 22 and the Public Switched Telephone Network (PSTN) 24, for example. The core network 20 provides access of the Internet 22 and the PSTN 24 to subscriber users, such as a user operating a User Equipment (UE) 26, via a Universal Terrestrial Radio Access Network (UTRAN) 28.

Within the UTRAN 28, there is a Radio Network Controller (RNC) 30 linked to a plurality of cells, two of which are shown and designated by the reference numerals 32 and 34. Each of the cells 32 and 34 can be covered by one or different Node Bs (not shown). The Node Bs are terrestrial base stations capable of communicating with the UE 26 wirelessly. The cells 32 and 34 can be served by one Node B or separate Node Bs. If the cells 32 and 34 are served by one Node B, the cells 32 and 34 are sometimes called sectors of the serving Node B.

Suppose in FIG. 1, the UE 26 initially communicates with the cell 32. The cell 32 is called the serving cell for the UE 26. Even though the UE 26 is currently communicating with the cell 32, the UE 26 monitors and maintains the pilot signals from few other cells. Information of these other cells, called the "active set," is stored in the memory of the UE 26. Suppose the UE 26 thereafter moves to the coverage area provided by the cell 34. The UE 26 senses the proximity with the cell 34 by receiving strong pilot signals from the cell 34, for instance.

With closer proximity and better signal strength, suppose the UE 26 decides to handoff the communication session from the cell 32 to the cell 34. To accomplish this end, the UE 26 needs to exchange messages with various entities. Heretofore, messages exchanged during handoff have mostly been designed to go through cells irrespective of the signal strength of signals received by the UE 26.

Reference is now returned to FIG. 1. The UE 26 starts the handoff process by sending a message with information regarding the pilot strength of all the cells in its active set to the RNC 30, via either the cell 32 and the cell 34, or both, as identified by the message paths 36 and 37, respectively, as shown in FIG. 1. As part of the message, the UE 26 may also report one particular cell has the strongest pilot signal and wish to switch to that cell as the serving cell.

Upon receipt of the message, the RNC 30 weighs the decision of whether to approve the handoff. The RNC 30 makes the decision based on a number of factors, such as the reported pilot strength and loading of the cells 32 and 34.

Suppose in this example, the RNC 30 approves of the serving cell change from the cell 32 to the cell 34. The RNC 30 sends a reconfiguration message which has parameters for accessing the cell 34 to the UE 26 via the cell 32. The path of the reconfiguration message is designated by the reference numeral 38 as shown in FIG. 1. The reason for sending the reconfiguration message through only the cell 32 is because the cell 32 is still the serving cell for the UE 26.

Suppose the UE 26 successfully receives the reconfiguration message via the cell 32. Based on the information of the reconfiguration message, the UE 26 can access the cell 34. If successful, the UE 26 sends a message to the RNC 30, again via the cells 32 and 34, in a manner similar to that as shown by the message paths 36 and 37, respectively, as previously described. The message basically reports the success of the handoff process.

The aforementioned serving cell change process can be successful if the communication conditions are favorable. However, in reality, communication conditions are not always favorable. Returning to FIG. 1, if the UE 26 is closer to the cell 34 and farther away from the cell 32, very possibly, the signal strength between the cell 32 and the UE 26 would be weak. Consequently, messages exchanged between the cell 32 and the UE 26, such as the messages sent via the paths 36 and 38 shown in FIG. 1, can be lost. This is especially true under certain scenarios. For instance, in an urban setting, changes of signal strength can be quite abrupt, which changes are mostly caused by dense city buildings. If the user of the UE 26 is in the midst of a Voice of IP (VoIP) call, inability to handoff the communication session from the cell 32 to the cell 34 can result in a dropped call.

Accordingly, there is a need to provide reliable and fast scheme for serving cell change in a wireless communication system.

SUMMARY

In a wireless communication system in which a mobile user using a mobile terminal during a communication session requests a serving cell change from a source cell to a target cell, the mobile terminal monitors the authorization for the serving cell change from a prearranged channel from the target cell. At the same time, the mobile terminal can decode data from either the source cell or the target cell. Upon receipt of authorization of the serving cell change from the target cell, the mobile terminal sends confirmation of the serving cell change to the target cell. Operated in this manner, abrupt termination of the communication session due to failure of the serving cell change can be curtailed.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Furthermore, in the following description, for reasons of conciseness and clarity, terminology associated with the Wideband Code Division Multiple Access (WCDMA) or Universal Mobile Telecommunications Systems (UMTS), as promulgated under the 3$^{rd}$ Generation Partnership Project (3GPP) by the International Telecommunication Union (ITU) is used. It should be emphasized that the invention is also applicable to other technologies, such as technologies and the associated standards related to Code Division Multiple Access (CDMA), Time Division Multiple Access (TDMA), Frequency Division Multiple Access (FDMA) Orthogonal Frequency Division Multiple Access (OFDMA) and so forth.

Figure 1:
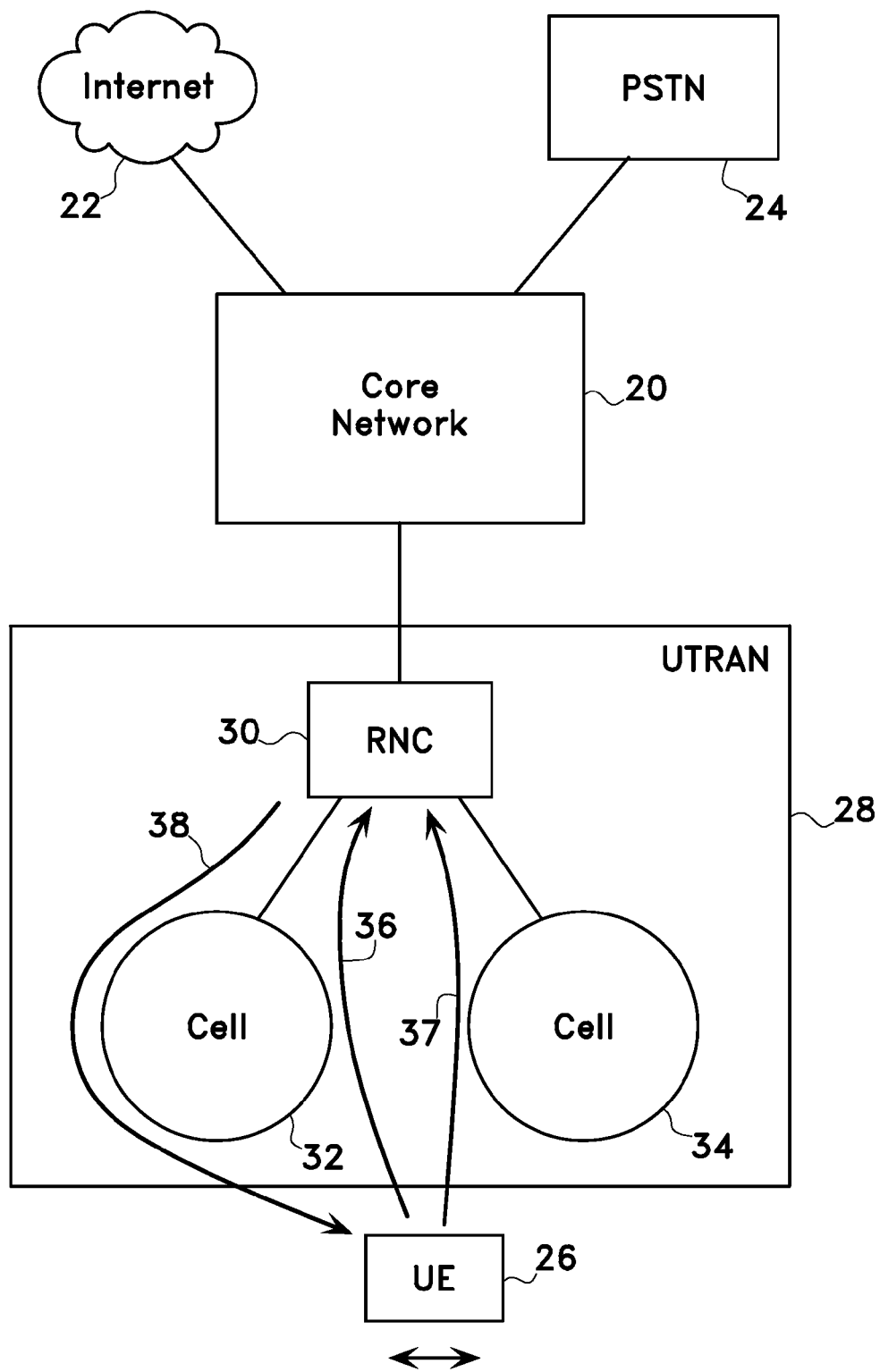
FIG. 1 is a simplified schematic drawing showing an exemplary communication system.
Figure 2:
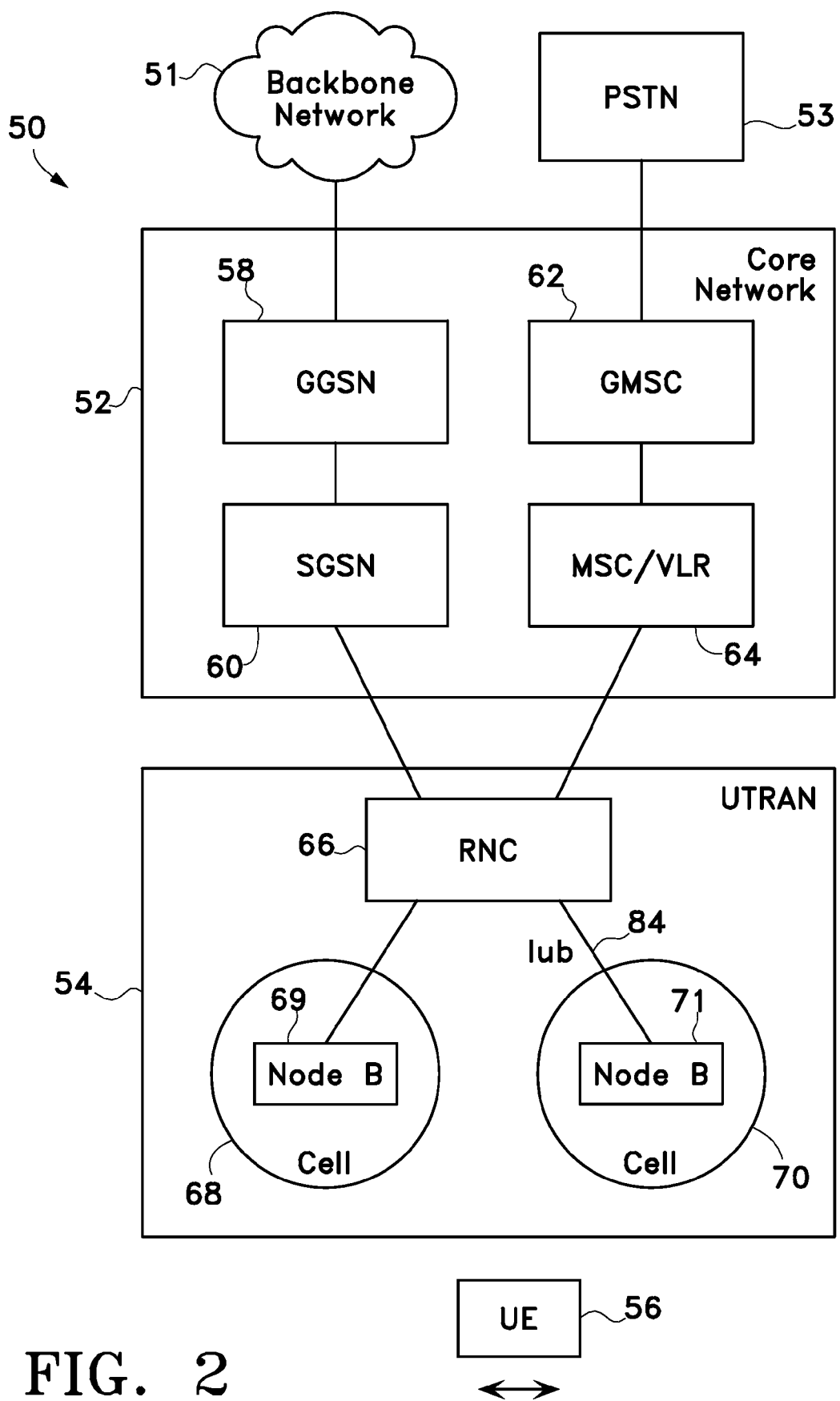
FIG. 2 is a simplified schematic drawing showing a communication system operated in accordance with an exemplary embodiment.

Reference is now directed to FIG. 2 which schematically shows the relationships of the various communication entities arranged in accordance with an exemplary embodiment of the invention.

In FIG. 2, the overall communication system is generally signified by the reference number 50. The communication system 50 includes a core network 52 linked to a Universal Terrestrial Radio Access Network (UTRAN) 54. The communication system 50 can provide data and voice services to a user operating a User Equipment (UE) 56.

In the core network 52, there is a GPRS Gateway Support Node (GGSN) 58 linked to a Serving GPRS Support Node (SGSN) 60. GPRS is an acronym for "General Packet Radio Service." The GGSN 58 is in turn connected to a backbone network 51, such as the Internet. On the other end, the SGSN 60 is tied to UTRANs, such as the UTRAN 54 shown in FIG. 2. Data services through access of the backbone network 62 can be provided to the user of the UE 56 though the GGSN 58, SGSN 60 and the UTRAN 54, for example.

For voice services, different entities in the core network 50 are utilized. First, outside of the core network 52, there is a Public Switched Telephone Network (PSTN) 53. The PSTN 53 is tied to a Gateway Mobile Switching Center (GMSC) 62 of the core network 52. The GMSC 62 in turn is connected to a Mobile Switching Center (MSC) which has a Visitor Location Register (VLR). The MSC and the VLS is collectively denoted by the reference numeral 64 shown in FIG. 2. The MSC/VLR 64 is connected to UTRANs, such as the UTRAN 54 shown in FIG. 2.

In the UTRAN 54, there is a Radio Network Controller (RNC) 66 linked to a plurality of cells, two of which are shown and designated by the reference numerals 68 and 70. In this example, the two cells 68 and 70 are part of the two Node Bs 69 and 71, respectively. The Node Bs are basically terrestrial base stations. It should be noted that instead of separate coverage, each of the cells 68 and 70 can be covered by only one Node B. If the cells 68 and 70 are served by one Node B, the cells 68 and 70 are sometimes called sectors of the serving Node B. As mentioned above, in this example, the cell 68 is served by the Node B 69. The cell 70 is served by the Node B 71.

The UE 56 is capable of roaming among cells. In operation, the UE 56 always monitors and maintains the pilot signals from all the reachable cells and is stored in the memory of the UE 56, called the "active set." Suppose in this example, geographically, the UE 56 initially is close to the cell 68 but the cell 70 is not far away. As such, the UE 56 first communicates with the cell 68. The UE 56 has both the cells 68 and 70 in its active set.

Further suppose the UE 56 is moving toward the cell 70 and begins to receive strong pilot signals from the cell 70. After certain criteria are met, which criteria will be described further later, the UE 56 decides to handoff the serving cell from the cell 68 to the cell 70. For ease of description, the cell 68 is called the source cell and the cell 70 is called the target cell. Furthermore, hereinbelow, the terms "handoff" and "serving cell change," and any equivalent terms thereof, are used interchangeably.

Figure 3:
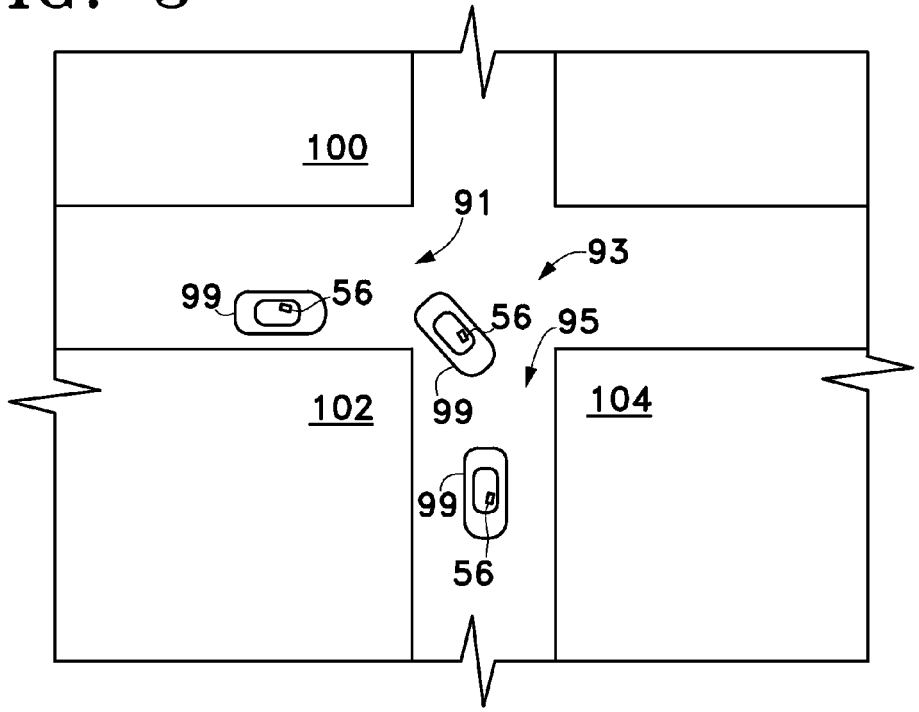
FIG. 3 is another schematic drawing which illustrates the urban canyon effect.

At this juncture, a digression is made for the explanation of the "urban canyon" effect. Shown in FIG. 2 is a schematic drawing in which there are no obstacles between the UE 56 and the cells 68 and 70. In reality, this seldom is the case, particularly in an urban setting where there are many objects and structures obstructing the propagation of signals. Consequently, changes of signal strength experienced by the UE 56 can sometimes be very sudden. FIG. 3 shows an example of such a scenario.

Figure 4:
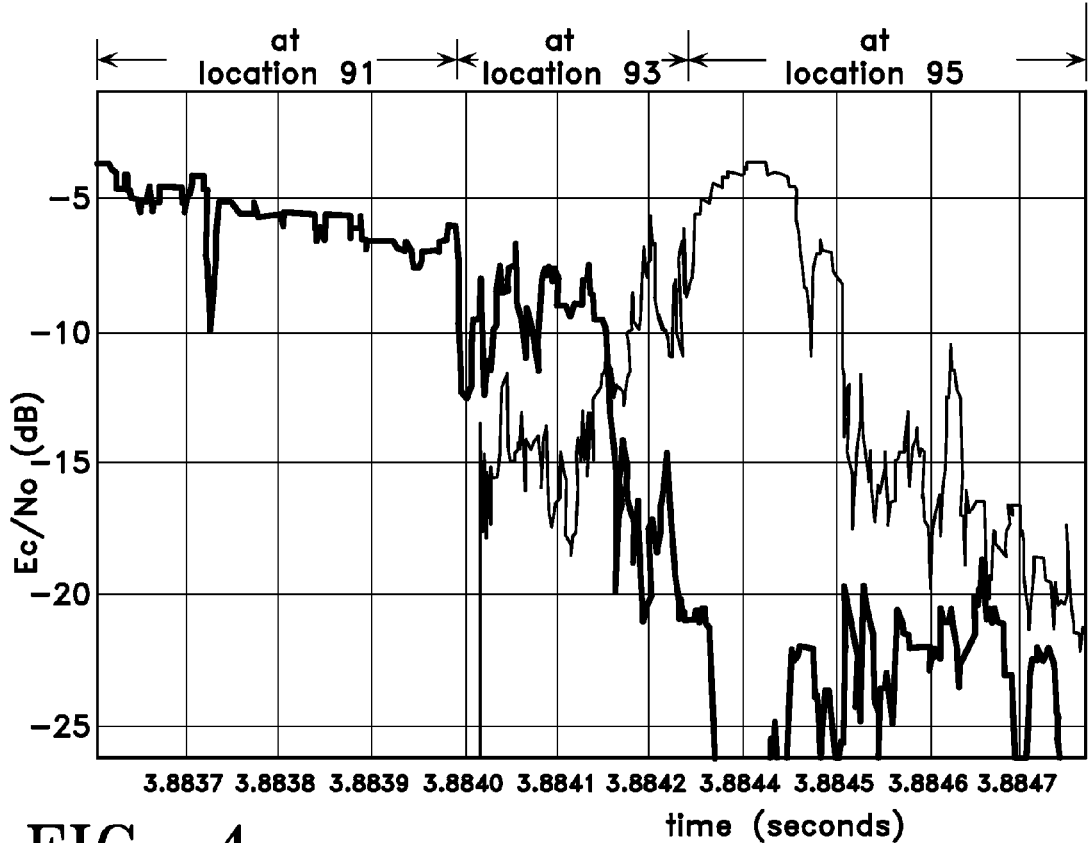
FIG. 4 is chart of signal strength of a source cell and a target cells vs. time resulted from the urban canyon effect as illustrated in FIG. 3.

FIG. 4 shows the signal strength of the two cells 68 and 70 at different points in time for the UE 56 as shown in FIG. 3. The y-axis is a ratio of energy per chip to interference noise energy, Ec/No, in dB. The x-axis is a time axis expressed in seconds. In FIG. 4, the signals represented by the thicker line are signals received by the UE 56 from the cell 68 (FIG. 2). Similarly, the signals represented by the thinner line are signals received by the UE 56 from the cell 70 (FIG. 2).

Reference is now directed to FIG. 3 in conjunction with FIG. 4. Suppose the user of the UE 56 is driving an automobile 99. Further suppose that when the UE 56 is between the buildings 100 and 102, as identified by the location denoted by the reference numeral 91, the UE 56 receives strong signals from the cell 68 (FIG. 2). However, when the automobile 99 turns the corner of the building 102 as indicated by the location denoted by the reference numeral 93 shown in FIG. 3, the UE 56 begins to receive strong signals from the cell 70

(FIG. 2). At the same time, the signal strength from the cell 68 begins to wane. After the automobile 99 completely turns the corner of the building 102 and is now between the building 102 and 104, as identified by the location denoted by the reference numeral 95, loss of the signal strength from the cell 68 can be significant. This is because the building 102 can considerably block the line-of-sight signals between the cell 68 and the UE 56. As such, the UE 56 can only receive signals from the cell 68 reflected off buildings. Typically, the reflected signals are much weaker in strength in comparison to the line-of-sight signals, as shown in FIG. 4.

It should be noted that abrupt changes of signal strength occur not only in the urban setting as depicted above. It is well known in the art that signal gains of an antenna are highly directional. That is, electromagnetic waves emanating from an antenna are in lobe patterns. Even without signal obstructions as in an urban environment, a slight movement in physical location can result in a significant change in signal reception. For example, a receiver receiving signals from an antenna within a lobe experiences strong signal reception. On the other hand, when the receiver is moved out of the lobe, the drop in the strength of the receiving signals can be drastic.

Reference is now continued with FIGS. 3 and 4. If the UE 56 cannot successfully change the serving cell in the ongoing communication session from cell 68 to the cell 70 in a timely manner, the communication session can be abruptly terminated. For instance, if the communication session is a Voice over IP (VoIP) call, or a Circuit-Switched (CS) voice call, the result would be a dropped call. The exemplary embodiment set forth below is described to address the aforementioned problem.

Figure 5:
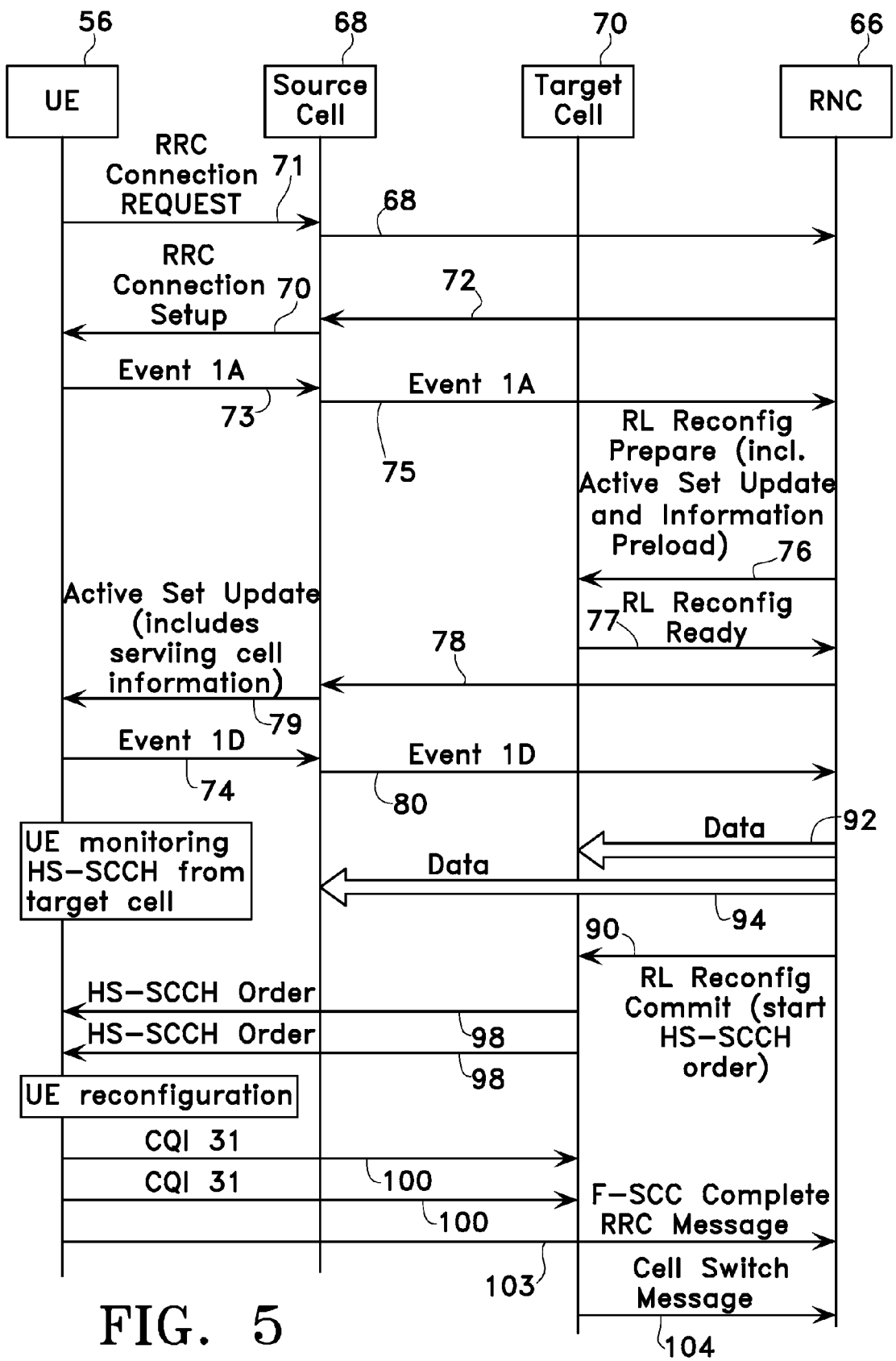
FIG. 5 is a call flow diagram which shows the message flows among different communication entities operating in the communication system of FIG. 2.

Reference is now directed to FIG. 5 in conjunction with FIG. 2. FIG. 5 is a call flow diagram which shows the flow of communication messages among the various communication entities during handoff by the UE 56 from the source cell 68 to the target cell 70. In the following description, for purposes of a clear and concise explanation, the UE 56 is depicted as operating under the High Speed Downlink Packet Access (HSDPA) services provided by the network 50 as promulgated by the 3GPP. One characteristic of any HSPDA service is that the UE 56 does not soft-combine signals received from different cells. Instead, the UE 56 receives all traffic signals from a single serving cell. Heretofore, change of serving cells according to conventional schemes has to rely on a highly robust serving cell which is not practically feasible, for example, due to the urban canyon effect as mentioned above.

Suppose at the beginning, the UE 56 starts communicating with the source cell 68. To begin a communication session, the UE 56 sends a RRC (Radio Resource Control) Connection Request message to the RNC 66 via the source cell 68, as indicated by the message paths 68 and 71, respectively, shown in FIG. 5.

If the request is approved by the RNC 66, the UE 56 receives a RRC Connection Setup message from the RNC 66 via the source cell 68, as indicated by the message paths denoted by the reference numerals 72 and 70, respectively. In the RRC Connection Setup message, information concerning the uplink and downlink resources, such as the scrambling code for the serving cell 68, is included.

At this juncture, the source cell 68 is the serving cell of the UE 56. Suppose at some point in time, the UE 56 detects pilot signals of the target cell 70 of comparable strength, for instance merely a few dB difference, to that of the source cell 68. Such a detection triggers the UE 56 to send a measurement report, called an "Event 1A" message, to the RNC 66 via the source cell 68, as indicated by the message paths 75 and 73, respectively, as shown in FIG. 5. In the Event 1A message, the UE 56 basically requests the RNC 66 to add the target cell 70 to the active set of the UE 56.

Upon receipt of the Event 1A message, the RNC 66 sends a Reconfig Prepare message via the message path 76 to the target cell 70, as shown in FIG. 5. In the Reconfig Prepare message, information for the target cell 70 to set up a radio link with the UE 56 is included.

With the information from the Reconfig Prepare message, the target cell 70 is able to set up the radio link for the UE 56. Once the link is established, the target cell 70 responds to the RNC 66 by sending a Reconfig Ready message via the message path 77 as shown in FIG. 5.

Thereafter, the RNC 66 sends an Active Set Update message to the UE 56 through the source cell 68, as indicated by the message paths 79 and 78, respectively, shown in FIG. 5. In accordance with the exemplary embodiment of the invention, in the Active Set Update message, it can include serving cell information such as the H-RNTI (High Speed Radio Network Temporary Identity) of the UE 56 in the target cell 70, the HS-SCCH (High Speed Shared Control Channel) channelization codes of the UE 56 in the target cell 70, and uplink E-DCH (Enhanced Dedicated Channel) information of the UE 56 in the target cell 70, e.g., the E-RNTI (E-DCH Radio Network Temporary Identity) and the E-AGCH (E-DCH Absolute Grant Channel). It should be noted that RNC 66 also sends the same information as described above to the target cell 70, i.e., the message as sent via the message path 76 in FIG. 5, which message has the necessary information the target cell 70 needs to send data to the UE 56.

Suppose at another point in time, the UE 56 detects stronger pilot signals from the target cell 70 as compared to that of the source cell 68. The UE 56 may then make a decision as to whether to change the target cell 70 as the serving cell from the source cell 68. The decision can be based on predefined criteria, for instance, as specified in the 3GPP Specification 25.331 published by the 3GPP. One of such criteria can be that the pilot signal from the target cell 70 is stronger than that of the source cell 68 by a predetermined amount of dB, called the hysteresis, for a predetermined duration, called the Time-To-Trigger (TTT). When the criteria are met, in this embodiment, the UE 56 sends an Event 1D measurement report to the RNC 66 via all the cells in the active set of the UE 56. An exemplary route for the Event 1D message sent by the UE 56 to the RNC 66 is via the source cell 68 to the RNC 66, as indicated by the message paths 74 and 80, respectively, shown in FIG. 5.

Once the Event 1D report is sent, the UE 56 starts monitoring HS-SCCH from the target cell 70. The HS-SCCH is a shared channel from the target cell 70. Alternatively, the UE 56 can monitor some other channels, such as a dedicated channel from the target cell 70. As mentioned earlier, the UE 56 has the channelization code of the HS-SCCH of the target cell 70 from Active Set Update message received earlier, i.e., the message received via the message path 79. It should be noted that the Active Set Update message may indicate one of the HS-SCCH codes for the UE 56 to monitor, so as to reduce the number of HS-SCCH codes that the UE 56 has to monitor on the target cell 70. As an alternative, the Active Set Update message may indicate several HS-SCCH codes for the UE 56 to monitor.

A timer may be set for the monitoring of the HS-SCCH of the target cell 70 by the UE 56. It should be noted that during monitoring, the UE 56 continues to decode data from the source cell 68 (data path not shown in FIG. 5). In the event that if no response is received from the target cell 70 and the timer expires, the UE 56 may continue to stay on with the source cell 68 as the serving cell.

On the side of the RNC 66, upon receipt of the Event 1D report, if the RNC 66 authorizes the UE 56 to change the serving cell, the RNC 66 starts to bicast data to the source cell 68 and the target cell 70, as indicated by the data path 94 and 92, respectively, in FIG. 5. At the same time, the RNC 66 also requests the target cell 70 to start sending an HS-SCCH Order to the UE 56 based on the same channelization code (or codes) received by the UE 56 in the Active Set Update message as mentioned earlier. The RNC 66 makes such a request by sending a Radio Link Reconfig Commit message via the message path 90 as shown in FIG. 5.

To comply with the request by the RNC 66, the target cell 70 starts sending one or more HS-SCCH Orders to the UE 56. Two such orders denoted by the reference numeral 98 are shown in FIG. 5. The reason for sending out more than one HS-SCCH Order is to allow the UE 56 to receive the HS-SCCH Order with higher reliability. Successful receipt of one HS-SCCH Order by the UE 56 is sufficient for the UE 56 to proceed to the next step. As an alternative, instead of one, the UE 56 may be allowed to proceed to the next step upon receipt of a predetermined number of HS-SCCH Orders, for instance, two.

Upon reception of the HS-SCCH Order, the UE 56 reconfigures itself for the access of the target cell 70.

What follows is the acknowledgement of receipt of the HS-SCCH Order by the UE 56. In this exemplary embodiment, the acknowledge is sent via a Channel Quality Indicator (CQI) message which is periodically sent out by the UE 56 to report to the serving cell, the target cell 70 in this case, of the existent quality of the radio link from the serving cell to the UE 56. The format of the CQI message as specified under the 3GPP Specification TS 25.214, published by the 3GPP, can be adopted. For example, under the 3GPP Specification TS 25.214, the CQI message comprises 5 data bits, starting with the $0^{th}$ bit to the $4^{th}$ bit. In this example, the acknowledge message is abbreviated as the CQI 31 message, wherein the number 31 is the highest value conveyable by the 5-bit CQI message (i.e., $31=2^5-1$). In this case, the value of the CQI 31 message has not been used under the 3GPP Specification TS 25.214. For a UE that is configured for Multiple-Input-Multiple-Output (MIMO) operations, the value of the CQI message is unused only for Type B bits. In that case, the Type B bits can be used for the sending of the CQI 31 message.

More than one CQI 31 messages are preferably sent out by the UE 56 to the target cell 70. Again, the purpose is to enable the target cell 70 to reliably receive the CQI 31 message sent by the UE 56. Message paths of two of the CQI 31 messages are denoted by the reference numeral 100 as shown in FIG. 5. The maximum number of CQI 31 messages sent by the UE 56 can be predefined. Once the maximum number is reached, the UE 56 can resume sending of the regular CQI messages, for instance.

Other ways of acknowledgement of receipt of the HS-SCCH Order, in lieu of sending the CQI 31 message as described, are possible. Furthermore, as an alternative, be it the CQI 31 message or other messages, the UE 56 can boost the transmission power when sending the acknowledgement messages, so as to enhance additional reliability of the target cell 70 in receiving the messages. In this embodiment, the receipt of the CQI 31 message by the target cell 70 concludes the successful change of the serving cell, i.e., from the source cell 68 to the target cell 70.

As a further safeguard, the UE 56 may also acknowledge receipt of the HS-HCCH Order by sending acknowledgement messages to the RNC 66 via all the cells in the active set of the UE 56. For example, as shown in FIG. 5, the UE 56 sends a F-SCC Complete RRC message to the RNC 66 via all the cells in the active set of the UE 56, as indicated by the message path 103 shown in FIG. 5. The acknowledge message sent via the path 103 by the UE 56 to the RNC 66 is especially applicable in situations in which the target cell, the cell 70 in this case, has a strong downlink but a weak uplink. This phenomenon is commonly called "link imbalance." Implementation of the safeguard as mentioned above can provide further reliability.

Upon receipt of the CQI 31 message from the UE 56, the target cell 70 informs the RNC 66 of the successful serving cell change by sending the RNC 66 a Cell Switch Complete RRC message, via the message path 104 as shown in FIG. 5.

Figure 6:
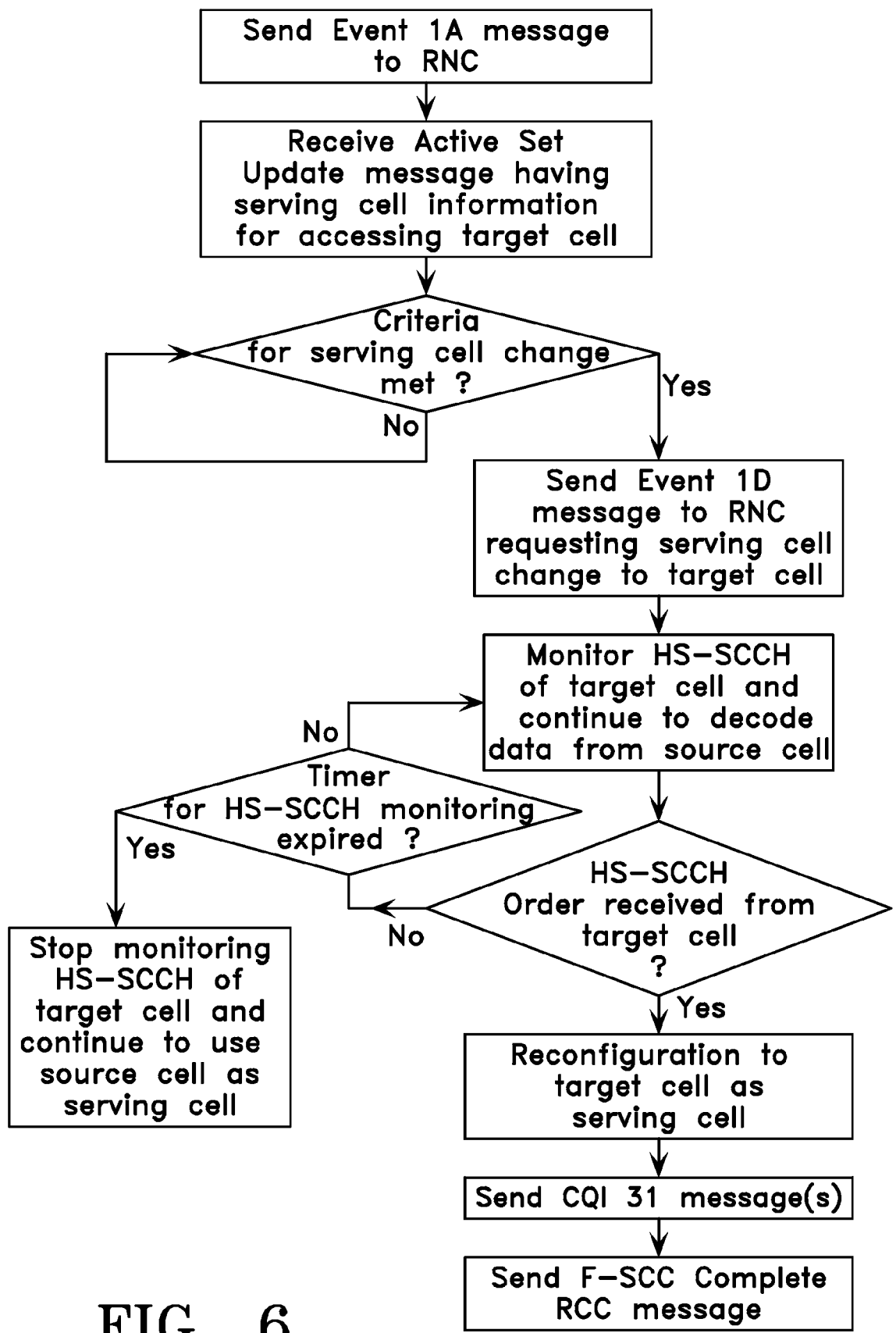
FIG. 6 is a flowchart which shows the procedures a user equipment takes in executing the handoff from the source cell to the target cell.

FIG. 6 is a flowchart which summarizes the steps involved by the UE 56 in carrying out the handoff process of the exemplary embodiment.

Figure 7:
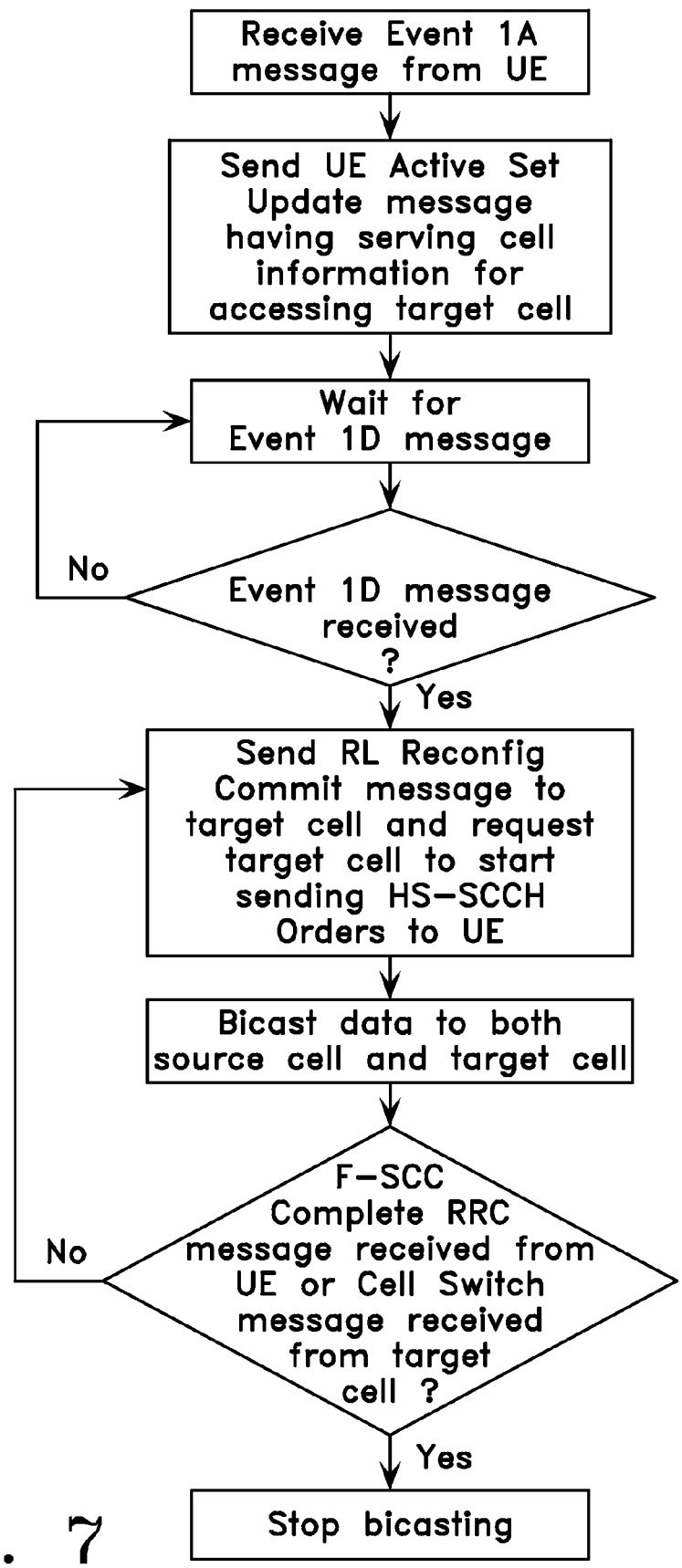
FIG. 7 is a flowchart which shows the procedures the target cell takes in executing the handoff from the source cell to the target cell.

FIG. 7 is another flowchart which summarizes the steps involved by the target cell 70 in carrying out the handoff process of the exemplary embodiment.

Figure 8:
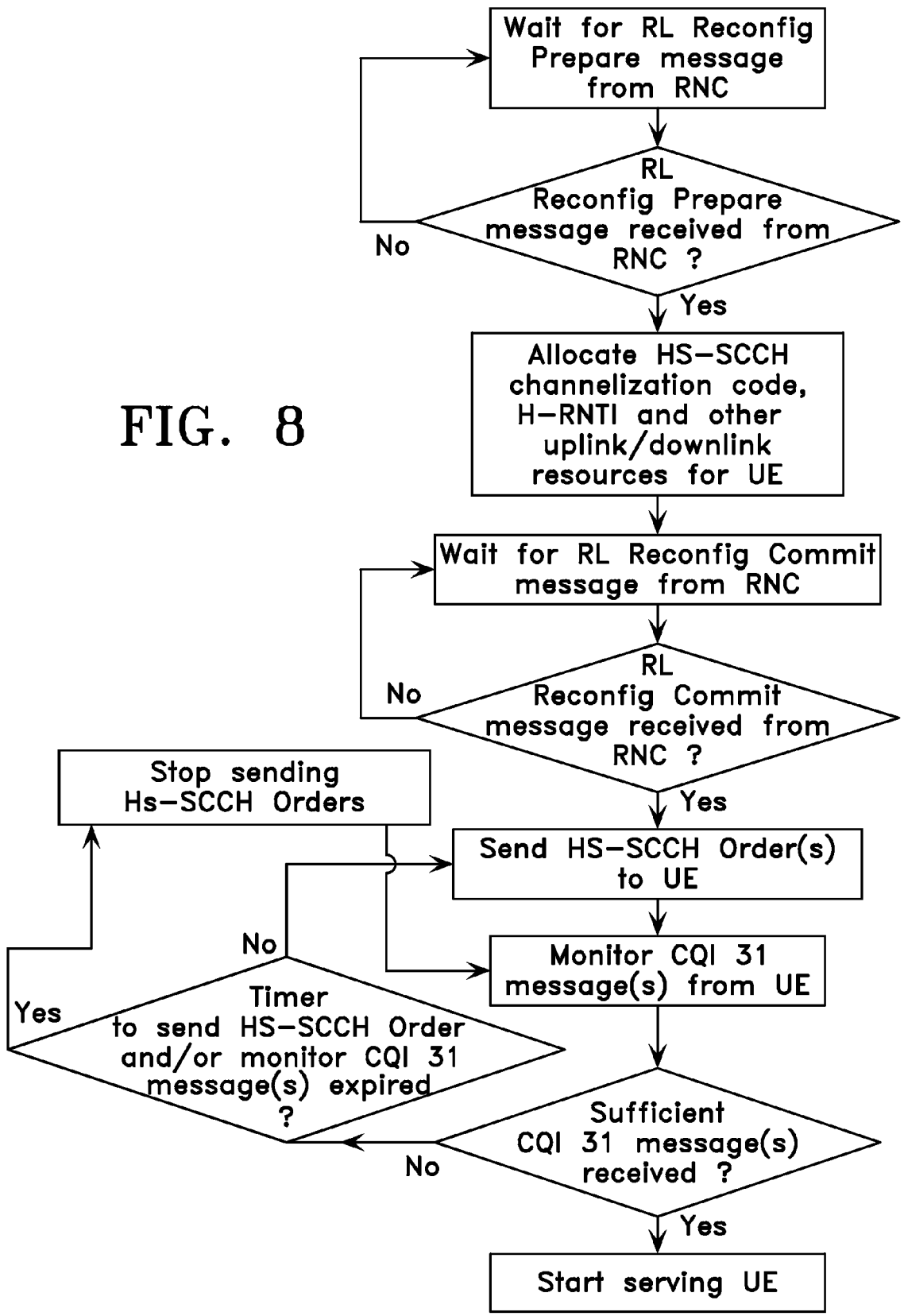
FIG. 8 is a flowchart which shows the procedures a radio network controller takes in executing the handoff from the source cell to the target cell.

FIG. 8 is another flowchart which summarizes the steps involved by the RNC 66 in carrying out the handoff process of the exemplary embodiment.

Figure 9:
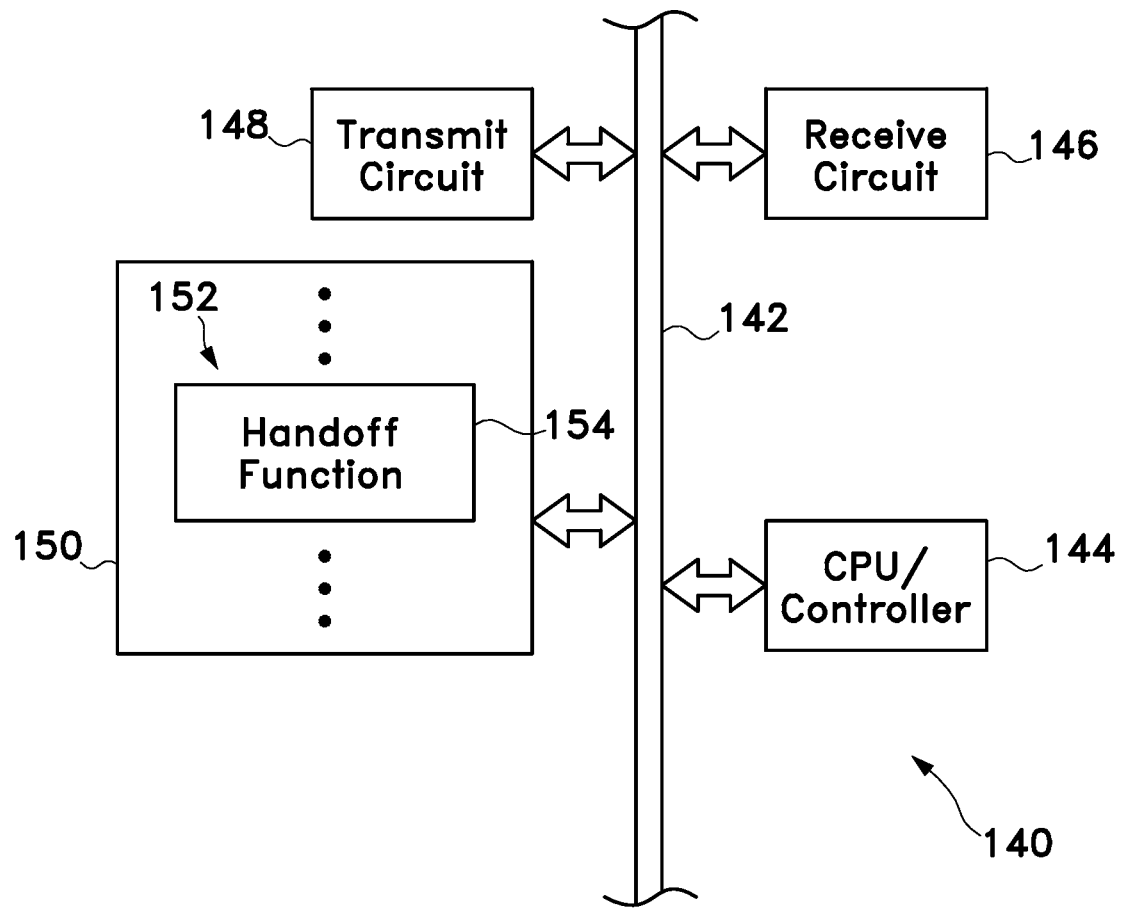
FIG. 9 is a schematic drawing of part of the hardware implementation of an apparatus for executing the handoff process in accordance with the exemplary embodiment.

FIG. 9 shows the part of hardware implementation of an apparatus for executing the handoff processes as described above. The circuit apparatus is signified by the reference numeral 140 and can be implemented in an UE or any communication entities, such as a Node B or a RNC.

The apparatus 140 comprises a central data bus 142 linking several circuits together. The circuits include a CPU (Central Processing Unit) or a controller 144, a receive circuit 146, a transmit circuit 148, and a memory unit 150.

If the apparatus 140 is part of a wireless device, the receive and transmit circuits 146 and 148 can be connected to a RF (Radio Frequency) circuit but is not shown in the drawing. The receive circuit 146 processes and buffers received signals before sending out to the data bus 142. On the other hand, the transmit circuit 148 processes and buffers the data from the data bus 142 before sending out of the device 140. The CPU/controller 144 performs the function of data management of the data bus 142 and further the function of general data processing, including executing the instructional contents of the memory unit 150.

Instead of separately disposed as shown in FIG. 9, as an alternative, the transmit circuit 148 and the receive circuit 146 can be parts of the CPU/controller 144.

The memory unit 150 includes a set of modules and/or instructions generally signified by the reference numeral 102. In this embodiment, the modules/instructions include, among other things, a handoff function 154. The handoff function 154 includes computer instructions or code for executing the process steps as shown and described in FIGS. 5-8. Specific instructions particular to an entity can be selectively implemented in the handoff function 154. For instance, if the apparatus 140 is part of a UE, instructions for carrying out the process steps along with the preparation and processing of the messages relevant to the UE as shown and described in FIGS. 5 and 6, can be coded in the handoff function 154. Similarly, if the apparatus 140 is part of an infrastructure communication entity, e.g., an RNC, process steps along with the relevant messages particular to that communication entity can be coded in the handoff function 154.

In this embodiment, the memory unit 150 is a RAM (Random Access Memory) circuit. The exemplary functions, such as the handoff function 154, are software routines, modules and/or data sets. The memory unit 150 can be tied to another memory circuit (not shown) which can either be of the volatile or nonvolatile type. As an alternative, the memory unit 150 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be further be noted that the inventive processes as described can also be coded as computer-readable instructions carried on any computer-readable medium known in the art. In this specification and the appended claims, the term "computer-readable medium" refers to any medium that participates in providing instructions to any processor, such as the CPU/controller 144 shown and described in the drawing figure of FIG. 9, for execution. Such a medium can be of the storage type and may take the form of a volatile or non-volatile storage medium as also described previously, for example, in the description of the memory unit 150 in FIG. 9. Such a medium can also be of the transmission type and may include a coaxial cable, a copper wire, an optical cable, and the air interface carrying acoustic, electromagnetic or optical waves capable of carrying signals readable by machines or computers. The computer-readable medium can be part of a computer product separate from the apparatus 140.

Finally, other changes are possible within the scope of the invention. Other than as described above, any other logical blocks, circuits, and algorithm steps described in connection with the embodiment can be implemented in hardware, software, firmware, or combinations thereof. It will be understood by those skilled in the art that theses and other changes in form and detail may be made therein without departing from the scope and spirit of the invention.

What is claimed is:

1. A method of handoff of a user equipment from a source communication entity to a target communication entity in a communication network, comprising:
   requesting, by the user equipment, a handoff from said source communication entity to said target communication entity;
   monitoring, by the user equipment, a channel for a response from said target communication entity;
   reconfiguring, by the user equipment, for access of said target communication entity upon receipt of the response from said target communication entity; and
   acknowledging, by the user equipment, receipt of said response by transmitting to said target communication entity at least one channel quality indicator message having a predetermined bit value that indicates an acknowledgement of said response.

2. The method as in claim 1 wherein said channel is a predetermined channel associated with said target communication entity.

3. The method as in claim 2 wherein said channel is selected from a group consisting of a dedicated channel and a shared channel.

4. The method as in claim 1 further comprising continuing to decode data from said source communication entity while monitoring said channel for said response from said target communication entity.

5. The method as in claim 4 further comprising monitoring said channel for said response from a predetermined channel selected from a group consisting of a dedicated channel and a shared channel.

6. The method as in claim 1 further comprising providing confirmation of said handoff in a message, and sending said message to a network control entity in said communication network, wherein said network control entity is different from said source communication entity and said target communication entity.

7. A communication apparatus operable in a communication network, comprising:
   means for requesting, at a user equipment, a handoff of the user equipment from a source communication entity to a target communication entity;
   means for monitoring, at the user equipment, a channel for a response from said target communication entity;
   means for reconfiguring, at the user equipment, for access of said target communication entity upon receipt of the response from said target communication entity; and
   means for acknowledging, at the user equipment, receipt of said response by transmitting to said target communication entity at least one channel quality indicator message having a predetermined bit value that indicates an acknowledgement of said response.

8. A communication apparatus operable in a communication network, comprising:
   a processor; and
   circuitry coupled to said processor configured to request, at a user equipment, a handoff of the user equipment from a source communication entity to a target communication entity, monitor, at the user equipment, a channel for a response from said target communication entity, reconfigure, at the user equipment, for access of said target communication entity upon receipt of said response from said target communication entity, and acknowledge, at the user equipment, receipt of said response by transmitting to said target communication entity at least one channel quality indicator message having a predetermined bit value that indicates an acknowledgement of said response.

9. The apparatus as in claim 8 wherein said channel is a predetermined channel associated with said target communication entity.

10. The apparatus as in claim 9 wherein said channel is selected from a group consisting of a dedicated channel and a shared channel.

11. The apparatus as in claim 8 wherein said circuitry coupled to said processor being further configured to continue to decode data from said source communication entity while monitoring said channel for said response from said target communication entity.

12. The apparatus as in claim 11 wherein said channel is selected from a group consisting of a dedicated channel and a shared channel.

13. The apparatus as in claim 8 wherein said circuitry coupled to said processor being further configured to provide confirmation of said handoff in a message, and send said message to a network control entity in said communication network, wherein said network control entity is different from said source communication entity and said target communication entity.

14. A non-transitory computer-readable medium comprising:
   a first set of codes for causing a computer to request, at a user equipment, a handoff of the user equipment from a source communication entity to a target communication entity;
   a second set of codes for causing the computer to monitor, at the user equipment, a channel for a response from said target communication entity;
   a third set of codes for causing the computer to reconfigure, at the user equipment, for access of said target communication entity upon receipt of said response from said target communication entity; and
   a fourth set of codes for causing the computer to acknowledge, at the user equipment, receipt of said response by transmitting to said target communication entity at least one channel quality indicator message having a predetermined bit value that indicates an acknowledgement of said response.

15. At least one processor configured to perform a handoff of a user equipment from a source communication entity to a target communication entity in a communication network, comprising:
- a first module for requesting, at the user equipment, a handoff from the source communication entity to the target communication entity;
- a second module for monitoring, at the user equipment, a channel for a response from said target communication entity;
- a third module for reconfiguring, at the user equipment, for access of said target communication entity upon receipt of said response from said target communication entity; and
- a fourth module for acknowledging, at the user equipment, receipt of said response by transmitting to said target communication entity at least one channel quality indicator message having a predetermined bit value that indicates an acknowledgement of said response.

16. The method as in claim 1 further comprising transmitting to a network control entity at least one message that indicates an acknowledgement of an authorization for said handoff after transmitting to said target communication entity the at least one channel quality indicator message having the predetermined bit value that indicates the acknowledgement of the response, wherein said network control entity is different from said source communication entity and said target communication entity.

17. The apparatus as in claim 8 wherein said circuitry coupled to said processor being further configured to transmit to a network control entity at least one message that indicates an acknowledgement of an authorization for said handoff after transmitting to said target communication entity the at least one channel quality indicator message having the predetermined bit value that indicates the acknowledgement of the response, wherein said network control entity is different from said source communication entity and said target communication entity.

18. The method as in claim 1 wherein said source communication entity and said target communication entity are base stations configured to communicate with said user equipment.

19. The method as in claim 6 wherein said network control entity is a radio network controller.

20. The method as in claim 16 wherein said network control entity is a radio network controller.

21. The apparatus as in claim 8 wherein said source communication entity and said target communication entity are base stations configured to communicate with said user equipment.

22. The apparatus as in claim 13 wherein said network control entity is a radio network controller.

23. The apparatus as in claim 17 wherein said network control entity is a radio network controller.

* * * * *